(12) United States Patent
Kim et al.

(10) Patent No.: US 9,944,152 B2
(45) Date of Patent: Apr. 17, 2018

(54) BATTERY COOLING SYSTEM FOR A VEHICLE

(71) Applicants: Hyundai Motor Company, Seoul (KR); Hanon Systems, Daejeon (KR)

(72) Inventors: Jae Yeon Kim, Hwaseong-si (KR); Hae Jun Lee, Daejeon (KR)

(73) Assignees: Hyundai Motor Company, Seoul (KR); Hanon Systems, Daejeon (KR)

( * ) Notice: Subject to any disclaimer, the term of this patent is extended or adjusted under 35 U.S.C. 154(b) by 32 days.

(21) Appl. No.: 15/188,772

(22) Filed: Jun. 21, 2016

(65) Prior Publication Data
US 2017/0106725 A1    Apr. 20, 2017

(30) Foreign Application Priority Data

Oct. 19, 2015  (KR) .................. 10-2015-0145630

(51) Int. Cl.
*B60H 1/32*    (2006.01)
*B60H 1/00*    (2006.01)

(52) U.S. Cl.
CPC ....... *B60H 1/3205* (2013.01); *B60H 1/00278* (2013.01); *B60H 1/00428* (2013.01); *B60H 1/00921* (2013.01); *B60H 1/004* (2013.01); *B60H 1/00392* (2013.01); *B60H 2001/00307* (2013.01); *B60H 2001/00928* (2013.01)

(58) Field of Classification Search
CPC ........... B60P 3/20; F25D 19/003; F25B 13/00
USPC .............................................. 62/239, 324.1
See application file for complete search history.

(56) References Cited

U.S. PATENT DOCUMENTS

| | | | |
|---|---|---|---|
| 6,357,541 | B1 | 3/2002 | Matsuda et al. |
| 2002/0184908 | A1 | 12/2002 | Brotz et al. |
| 2005/0167169 | A1 | 8/2005 | Gering et al. |
| 2010/0012295 | A1 | 1/2010 | Nemesh et al. |
| 2012/0183815 | A1 | 7/2012 | Johnston et al. |
| 2013/0118707 | A1 | 5/2013 | Kardos et al. |
| 2014/0033761 | A1 | 2/2014 | Kawakami et al. |

(Continued)

FOREIGN PATENT DOCUMENTS

| | | |
|---|---|---|
| JP | 2006-244928 A | 9/2006 |
| JP | 2010-114063 A | 5/2010 |
| KR | 10-0970336 B1 | 7/2010 |

(Continued)

*Primary Examiner* — Melvin Jones
(74) *Attorney, Agent, or Firm* — Morgan, Lewis & Bockius LLP

(57) ABSTRACT

A battery cooling system for a vehicle, to warm up or cool down a battery installed in the vehicle by selectively using a refrigerant and a coolant according to a mode of the vehicle may include a heat exchanger, connected with a refrigerant line of a heat pump system through first and second connection lines, connected with a cooling line of a cooling system for an electric device through a battery cooling line, and configured to selectively eat-exchange between the coolant and refrigerant introduced into the heat exchanger, two first valves disposed in the battery cooling line with the heat exchanger disposed therebetween, and selectively connecting the cooling line and the battery cooling line, a first branch line connected with the refrigerant line through a second valve, and a second branch line selectively connecting the refrigerant line and the second connection line through a third valve and a fourth valve.

19 Claims, 7 Drawing Sheets

(56) References Cited

U.S. PATENT DOCUMENTS

2014/0060102 A1  3/2014  Nemesh et al.
2015/0165869 A1* 6/2015  Kim .................. B60H 1/00885
                                                      701/36

FOREIGN PATENT DOCUMENTS

| KR | 10-2013-0099048 A | 9/2013 |
| KR | 10-2014-0085898 A | 7/2014 |
| KR | 10-2014-0147365 A | 12/2014 |
| KR | 10-2015-0068843 A | 6/2015 |
| KR | 10-2015-0098729 A | 8/2015 |
| WO | WO 2012/013583 A1 | 2/2012 |

* cited by examiner

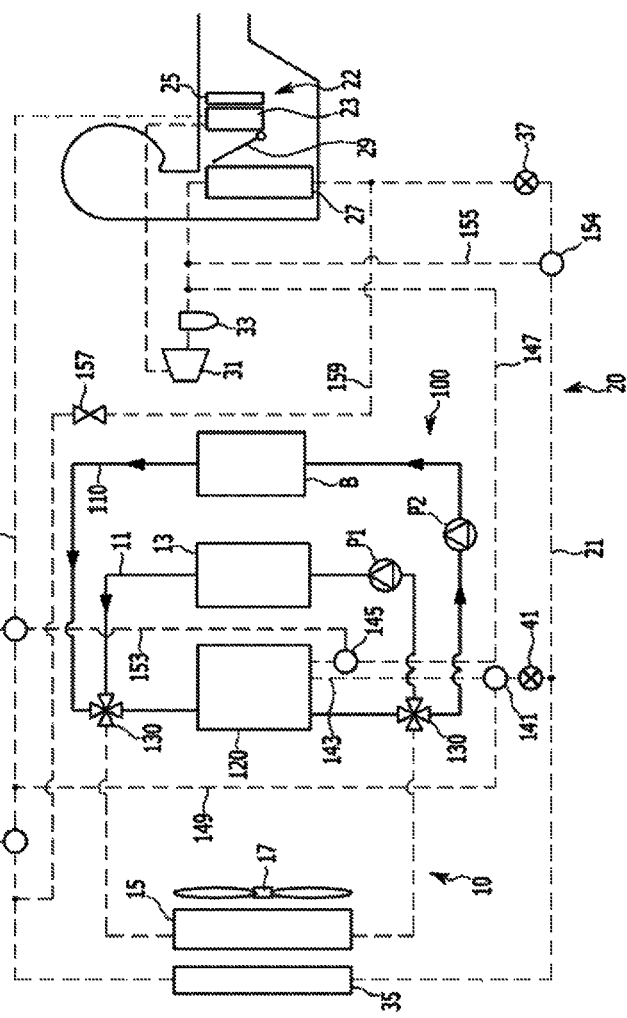
FIG. 7  <Heat pump system non-operation mode, Battery warm-up>

BATTERY COOLING SYSTEM FOR A VEHICLE

CROSS-REFERENCE TO RELATED APPLICATION

The present application claims priority to Korean Patent Application No. 10-2015-0145630 filed Oct. 19, 2015, the entire contents of which is incorporated herein for all purposes by this reference.

BACKGROUND OF THE INVENTION

Field of the Invention

The present invention relates to a battery cooling system for a vehicle. More particularly, the present invention relates to a battery cooling system that makes a heat pump system and a cooling system for an electric device, circulating a coolant to the electric device including a motor integrated with each other in an electric vehicle or a hybrid vehicle, and warming up or cooling down a battery using a refrigerant and a coolant according to a mode of the vehicle.

Description of Related Art

In general, an air conditioning device for a vehicle includes an air conditioning system that circulates a refrigerant to heat or cool the inside of the vehicle.

Such an air conditioning means is provided to maintain a pleasant indoor environment by maintaining an indoor temperature of the vehicle with an appropriate temperature regardless of an external temperature change, and is configured to warm or cool the inside of the vehicle through heat-exchange by an evaporator while a refrigerant discharged by driving of a compressor is being circulated back to the compressor through a condenser, a receiver dryer, an expansion valve, and the evaporator.

That is, a high-temperature high-pressure gas-state refrigerant compressed from the compressor is condensed through the condenser and then evaporated in the evaporator through the receiver dryer and the expansion valve to thereby decrease an indoor temperature and humidity.

Meanwhile, as a concern about energy efficiency and environmental contamination problems has been increased, a development and research for an environmentally-friendly vehicle that can replace an internal combustion engine vehicle has been requested, and such an environmentally-friendly vehicle can be classified into an electric vehicle driven using a fuel cell or electricity as a power source and a hybrid vehicle driven by an engine or a battery.

Among the environmentally-friendly vehicles, no additional heater is used in the electric vehicle or the hybrid vehicle unlike an air conditioning device of a typical vehicle, and an air conditioning device applied to the environmentally-friendly vehicle is typically called a heat pump system.

In the case of the electric vehicle using a fuel cell, chemical reaction energy of oxygen and hydrogen is converted into electric energy to generate driving force, and during this process, heat energy is generated by chemical reaction in the fuel cell, and as a result, it is necessary to effectively remove generated heat to secure performance of the fuel cell.

Even in the hybrid vehicle, the driving force is generated by driving the motor by using electricity supplied from the fuel cell or the electric battery together with the engine that is actuated with general fuel, and as a result, the performance of the motor can be secured only by effectively removing the heat generated from the fuel cell or the battery, and the motor.

Accordingly, a cooling means for an electric device, a heat pump system, and a battery cooling system should be configured as individual closed circuits respectively so as to prevent heat generation from a motor, an electric device, and a battery including a fuel cell in a conventional hybrid vehicle or electric vehicle.

Thus, the size and weight of a cooling module disposed in a front portion of the vehicle are increased, and layouts for connection wires through which a refrigerant or a coolant is supplied to the heat pump system, the cooling means, and the battery cooling system from the inside of an engine room are complicated.

Further, for optimal performance of the battery, a battery cooling system that warms up or cools down the battery according to a state of the vehicle is separately provided, and thus a plurality of valves are provided for connection with the respective connection wires and noise and vibration caused from frequent opening/closing of the valves is transferred to the inside of the vehicle, thereby deteriorating riding comfort of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a battery cooling system for a vehicle for interworking between a heat pump system and a cooling system for an electric device, circulating a coolant to the electric device including a motor in an electric vehicle and a hybrid vehicle, and warming up or cooling down a battery according to a mode of the vehicle by selectively using a coolant and a refrigerant.

According to various aspects of the present invention, a battery cooling system for a vehicle to warm up or cool down a battery installed in the vehicle by selectively using a refrigerant and a coolant according to a cooling mode, a heating mode, a heating/dehumidification mode, and a non-operation mode of a heat pump system of the vehicle may include a heat exchanger for the battery, connected with a refrigerant line of the heat pump system through first and second connection lines, connected with a cooling line of a cooling system for an electric device through a battery cooling line, and configured to selectively perform heat-exchange between the coolant and the refrigerant introduced into the heat exchanger, two first valves respectively disposed in the battery cooling line with the heat exchanger disposed therebetween, and selectively connecting the cooling line and the battery cooling line, a first branch line connected with the refrigerant line through a second valve provided on the first connection line, and a second branch line selectively connecting the refrigerant line and the second connection line through a third valve provided in the second connection line and a fourth valve provided in the refrigerant line.

The heat pump system may include a heating, ventilation, and air condition (HVAC) module connected through the refrigerant line, and provided with a door that controls selective introduction of external air passed through an evaporator to an internal condenser and a heater according to a cooling mode, a heating mode, and a heating/dehumidification mode of the vehicle, a compressor connected through the refrigerant line between the evaporator and the internal condenser, an accumulator provided in the refrigerant line between the compressor and the evaporator, an external condenser connected with the internal condenser through the refrigerant line and disposed in a front portion of the vehicle, a first expansion valve provided in the refrigerant line that connects the external condenser and the evaporator, a third branch line connected with the refrigerant line between the evaporator and the accumulator through a fifth valve provided between the external condenser and the first expansion valve, and a dehumidification line of which a first end is connected with the refrigerant line between the internal condenser and the external condenser and a second end is connected between the evaporator and the expansion valve, and including a sixth valve.

The first connection line may include a second expansion valve.

An orifice may be provided in the refrigerant line between the internal condenser and the external condenser.

The orifice may selectively open/close the refrigerant line or may selectively expand the refrigerant passing therethrough.

The first branch line may be connected with the refrigerant line between the fourth valve and the orifice.

When the battery is cooled down in the cooling mode of the vehicle the first, second, and third branch lines may be closed through operations of the second, third, fourth, and fifth valves, and the external condenser may be connected in parallel with the heat exchanger and the evaporator.

When the battery is cooled down in the heating mode of the vehicle the first, second, and third branch lines may be closed through operations of the second, third, fourth, and fifth valves, and the refrigerant line connected with the evaporator may be closed.

When the battery is warmed up in the heating mode of the vehicle the first, second, and third branch lines may be opened through operations of the second, third, fourth, and fifth valves, and the refrigerant line connecting the evaporator and the fifth valve and the second connection line may be closed.

When the battery is warmed up in the heating/dehumidification mode of the vehicle the first, second, and third branch lines and the dehumidification line may be opened through operations of the second, third, fourth, fifth, and sixth valves, and the refrigerant line connecting the evaporator and the fifth valve and the second connection line may be closed.

In the heating mode and heating/dehumidification mode of the vehicle, the internal condenser may be connected in series to the heat exchanger and the external condenser.

The second, third, fourth, and fifth valves may be three-way valves that are selectively opened/closed in cooling down or warming up of the battery according to a cooling mode, a heating mode, a heating/dehumidification mode of the vehicle, and a non-operation mode of the heat pump system.

The first valve may operate to make the coolant selectively introduced into the heat exchanger when the battery needs to be warmed up or cooled down according to a mode of the vehicle, and may be a four-way valve.

The cooling system may include an electric device including a motor, a radiator disposed in a front portion of the vehicle, and a first water pump provided on the cooling line that connects the electric device and the radiator, for circulation of the coolant.

A second water pump may be provided in the battery cooling line between the battery and the heat exchanger.

When the battery is cooled down in the cooling mode and the heating mode of the vehicle the battery cooling line may be opened for connection between the battery and the heat exchanger through operation of the first valve, the cooling line may be selectively opened/closed through operation of the first valve according to a cool-down request of the electric device and a coolant temperature, and the cooling line and the battery cooling line may be communicated with each other when the cooling line is being opened.

When the battery is warmed up in the heating mode of the vehicle, the cooling line may be closed through operation of the first valve and the battery cooling line may be opened for connection between the battery and the heat exchanger.

When the battery is warmed up in the heating/dehumidification mode of the vehicle the battery cooling line may be opened for connection between the battery and the heat exchanger through operation of the first valve, and the cooling line may be selectively opened/closed through operation of the first valve according to a cool-down request of the electric device and a coolant temperature.

When the battery is cooled down in the non-operation mode of the heat pump system the cooling line may be opened for connection between the electric device and the radiator through operation of the first valve, and the cooling line and the battery cooling line may be communicated with each other while the battery cooling line that connects the battery and the heat exchanger is being closed.

When the battery is warmed up in the non-operation mode of the heat pump system the cooling line that connects the electric device and the radiator may be closed through operation of the first valve, and the cooling line and the battery cooling line may be communicated with each other while the battery and the heat exchanger are connected with each other through the battery cooling line.

According to various embodiments of the present invention, the battery cooling system for the vehicle enables interworking between the heat pump system and the cooling system for the electric device, circulating the coolant to the electric device that includes a motor in the electric vehicle or the hybrid vehicle, and warm up or cool down the battery according to a mode of the vehicle by using the coolant and the refrigerant, thereby simplifying the entire system.

In addition, the battery can be effectively warmed up and cooled down according to a mode of the vehicle so that the battery can provide optimal performance and a total driving distance of the vehicle can be increased.

Further, manufacturing cost and the weight of the system can be decreased by simplification of the entire system and utilization of space can be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is an operation state view of the battery being warmed up in the non-operation mode of the heat pump system in the exemplary battery cooling system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
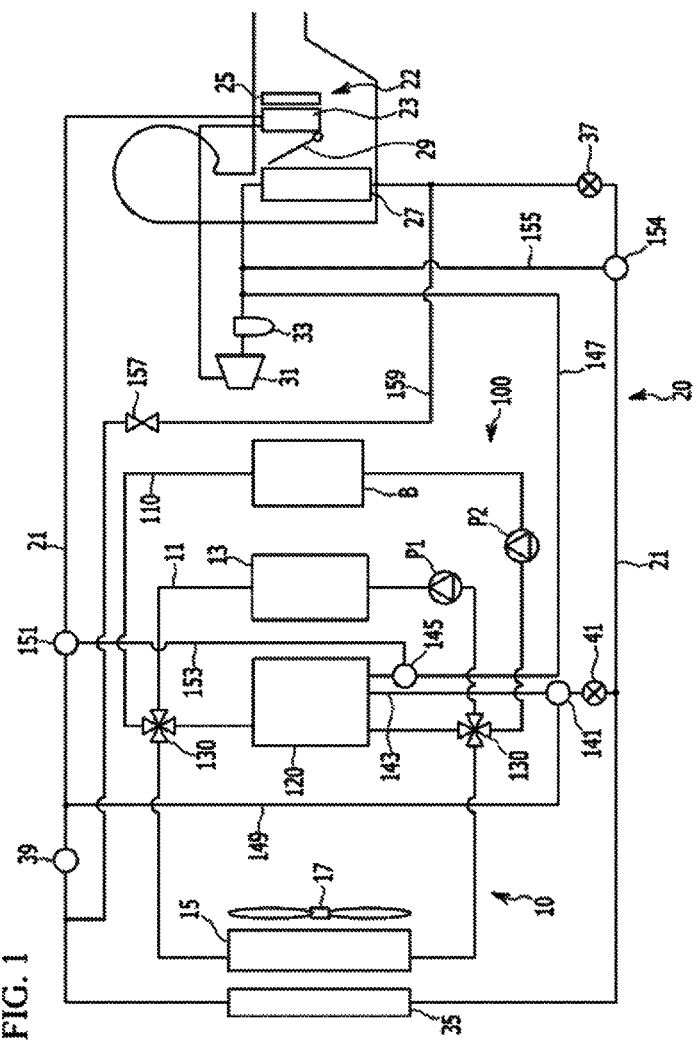
FIG. 1 is a block diagram of an exemplary battery cooling system for a vehicle according to the present invention.

FIG. 1 is a block diagram of a battery cooling system for a vehicle according to various embodiments of the present invention. A battery cooling system 100 for a vehicle according to various embodiments of the present invention is applicable to an electric vehicle or a fuel cell vehicle equipped with a cooling system 10 for an electric device and a heat pump system 20. Such a battery cooling system 100 selectively uses a refrigerant and a coolant to warm-up or cool-down a battery B installed in a vehicle according to a cooling mode, a heating mode, a heating/dehumidification mode, and a non-operation mode of the heat pump system 20.

As shown in FIG. 1, the battery cooling system 100 includes a heat exchanger for a battery (hereinafter, referred to as a heat exchanger 120), a first valve 130, a first branch line 149, and a second branch line 153. First, the heat exchanger 120 is connected with the refrigerant line 21 of the heat pump system 20 through first and second connection lines 143 and 147, and is connected with the cooling line 11 of the cooling system 10 through a battery cooling line 110. The heat exchanger 100 performs heat-exchange between a coolant supplied through the battery cooling line 110 and a refrigerant selectively supplied through the first and second connection lines 143 and 147.

Here, the cooling system 10 includes an electric device 13 including a motor, a radiator 15 for an electric device, disposed in a front portion of the vehicle, a cooling fan 17 mounted to a rear portion of the radiator 15, and a first water pump P provided on the cooling line 11 that connects the electric device 13 and the radiator 15 and operating to circulate the coolant. A second water pump P2 may be provided in the battery cooling line 110 between the battery B and the heat exchanger 120. The second water pump P2 circulates the coolant through the battery cooling line 110.

In various embodiments, the first valve 130 is provided in each of two positions where the cooling line 11 and the battery cooling line 110 cross each other, interposing the batter heat exchanger 120. Such a first valve 130 allows selective communication between the cooling line 11 and the battery cooling line 110, or controls flow of each coolant flowing through the cooling line 11 and the battery cooling line 110. Here, the first valve 130 operates to make the coolant selectively flow to the heat exchanger 110 when the battery needs to be warmed up or cooled down according to a mode of the vehicle, and may be provided as a 4-way valve.

In various embodiments, the first branch line 149 is connected with the refrigerant line 21 through the second valve 141 provided on the first connection line 143. In addition, the second branch line 153 selectively connects a third valve 145 provided in the second connection line 147 to the refrigerant line 21 and the second connection line 147 through a fourth valve 151 provided in the refrigerant line 21.

Meanwhile, in various embodiments, the heat pump system 20 includes a heating, ventilation, and air conditioning (HVAC) module 22 connected through the refrigerant line 21, a compressor 31, an accumulator 33, an external condenser 35, a first expansion valve 37, a third branch line 155, and a dehumidification line 159. First, the HVAC module 22 is connected through the refrigerant line 21, and an opening/closing door 29 that selectively controls introduction of external air passed through an evaporator 27 to an internal condenser 23 and a heater 25 according to a cooling mode, a heating mode, and a heating/dehumidification mode of the vehicle. That is, the opening/closing door 29 is opened for introduction of the external air passed through the evaporator 27 to the internal condenser 23 and the heater 25 in the heating mode of the vehicle. On the contrary, the door 29 is closed to close the internal condenser 23 and the heater such that the external air cooled through the evaporator 27 is introduced directly into the inside of the vehicle in the cooling mode of the vehicle.

The compressor 31 is connected through the refrigerant line 21 between the evaporator 157 and the internal condenser 23. Such a compressor 31 compresses a refrigerant in a gas state. The accumulator 33 is provided in the refrigerant line 21 between the compressor 31 and the evaporator 27. Such an accumulator 33 supplies only the gas-state refrigerant to the compressor 31 to thereby improve efficiency and durability of the compressor 31. In various embodiments, the external condenser 35 is connected with the internal condenser 27 through the refrigerant line 21. The external condenser 35 is disposed in a front side of the radiator 115 to heat-exchange the refrigerant introduced thereinto with the external air.

The first expansion valve 37 is provided in the refrigerant line 21 that connects the external condenser 35 and the evaporator 27, and receives and expands the refrigerant passed through the external condenser 35. The third branch line 155 is connected with the refrigerant line 21 between the evaporator 27 and the accumulator 33 through a fifth valve 154 provided between the external condenser 35 and the first expansion valve 37. Here, the second, third, fourth, and fifth valves 141, 145, 151, and 154 may be 3-way valves that are selectively opened and closed for cooling down or warming up the battery B according to the cooling mode, the heating mode, and the heating/dehumidification mode of the vehicle and the non-operation mode of the heat pump system. In addition, a dehumidification line 159 is connected with the refrigerant line 21 through one end thereof between the internal condenser 23 and the external condenser 35, and the other end of the dehumidification line 159 is connected between the evaporator 27 and the expansion valve 37. The dehumidification line 159 is provided with a sixth valve 157.

In various embodiments, the refrigerant line 21 may be provided with an orifice 39 between the internal condenser 23 and the external condenser 35. The orifice 39 serves to expand the refrigerant exhausted from the internal condenser 23. In addition, the orifice 39 may serve as a valve that selectively circulates the refrigerant without expansion of the refrigerant according to the cooling mode, heating mode, and heating/dehumidification mode. That is, the orifice 39 may selectively open/close the refrigerant line 21 or selectively expand the refrigerant passing therethrough. Here, one end of the first branch line 149 is connected with the refrigerant line 21 between the fourth valve 151 and the orifice 39 and the other end thereof is connected with the first connection line 143 through the second valve 141. In addition, the fourth valve 151 may be disposed between the internal condenser 23 and the orifice 39.

Meanwhile, in various embodiments, the first connection line 143 is provided with a second expansion valve 41. The second expansion valve 41 expands the refrigerant for introduction of the refrigerant in a low temperature state when the refrigerant exhausted from the external condenser 35 is introduced into the heat exchanger 120. Here, the second valve 141 may be disposed between the heat exchanger 120 and the second expansion valve 41. Hereinafter, operation of the battery cooling system 100 configured as above according to various embodiments of the present invention according to each mode of the vehicle will be described in detail with reference to FIG. 2 to FIG. 7.

Figure 2:
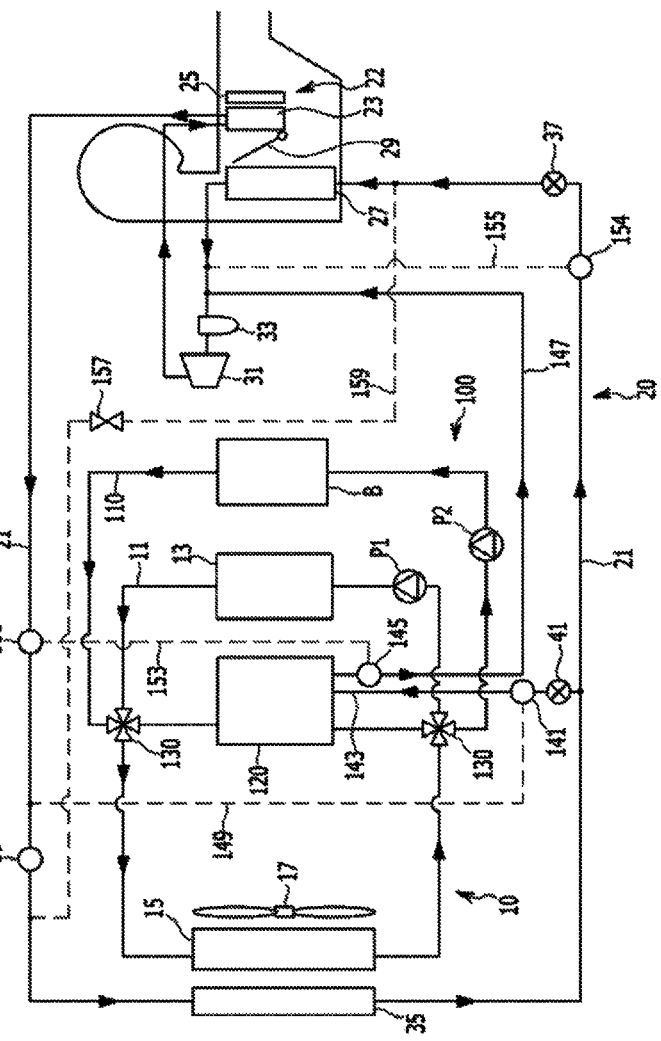
FIG. 2 is an operation state view of a battery being cooled in the exemplary battery cooling system in a cooling mode of the vehicle according to the present invention.

First, battery cooling operation of the battery cooling system 100 according to various embodiments of the present invention in the cooling mode of the vehicle will be described with reference to FIG. 2. FIG. 2 is an operation state view of battery cooling operation of the battery cooling system according to various embodiments of the present invention in the cooling mode of the vehicle. Referring to FIG. 2, when the battery B is cooled down in the cooling mode of the vehicle, the refrigerant line 11 is selectively opened/closed through operation of the first valve 130 according to a cool-down request of the electric device 13 and a coolant temperature in the cooling system 10.

Simultaneously, the battery cooling line 110 is opened for connection with the battery B and the heat exchanger 120 through operation of the first valve 130. Accordingly, when the cooling line 11 is opened, the cooling line 11 and the battery cooling line 110 are communicated with each other.

In this case, the refrigerant cooled in the radiator 35 is circulated through the refrigerant line 11 so as to cool down the electric device 13 through operation of the first water pump P1 and is circulated through the battery cooling line 110 through operation of the second water pump P2. The refrigerant circulating the battery cooling line 110 is cooled through heat-exchange with the refrigerant in the heat exchanger 120, and then supplied to the battery B. Accordingly, the battery B is cooled down by the cooled refrigerant.

Meanwhile, in the heat pump system 20, the first, second, and third branch lines 149, 153, and 155 are closed through operations of the second, third, fourth, and fifth valves 141, 145, 151, and 154. Then, the external condenser 35 can be connected in parallel with the heat exchanger 120 and the evaporator 27 through the refrigerant line 21. A part of the refrigerant exhausted from the external condenser 35 is expanded and thus becomes a low-temperature low-pressure state through operation of the second expansion valve 41 and thus being introduced into the heat exchanger 120 connected with the first connection line 143. After that, the refrigerant introduced into the heat exchanger 120 exchanges heat with the coolant, and then introduced into the refrigerant line 21 between the evaporator 27 and the accumulator 33 through the second connection line 147.

Accordingly, the coolant of which temperature is increased while cooling down the battery B is cooled by exchanging heat with the low-temperature and low-pressure refrigerant in the heat exchanger 120. The cooled refrigerant is supplied back to the battery B through the battery cooling line 110. That is, the refrigerant can effectively cool down the battery B by iteratively performing the above-stated operation. The rest of refrigerant exhausted from the external condenser 35 flows through the refrigerant to cool the side of the vehicle, and sequentially passes the first expansion valve 37, the evaporator 27, the accumulator 33, the compressor 21, and the internal condenser 23. Here, the external air introduced into the HVAC module 22 is cooled by the low-temperature and low-pressure refrigerant introduced into the evaporator 27 while passing through the evaporator 27.

In this case, the opening/closing door 29 closes a portion through which the cooled external air passes to the internal condenser 23 so as to prevent the cooled external air from passing through the internal condenser 23 and the heater 25. Thus, the cooled external air is directly introduced into the inside of the vehicle, thereby cooling down the inside of the vehicle. After that, the refrigerant is introduced into the external condenser 35 through the orifice 39 and then condensed through heat-exchange with the external air while passing through the external condenser 35. In this case, the orifice 39 may operate as a valve. That is, through iterative performance of the above-stated process, the refrigerant cools down the inside of the vehicle in the cooling mode of the vehicle, and at the same time cools down the coolant through heat-exchange while passing through the heat exchanger 120.

Figure 3:
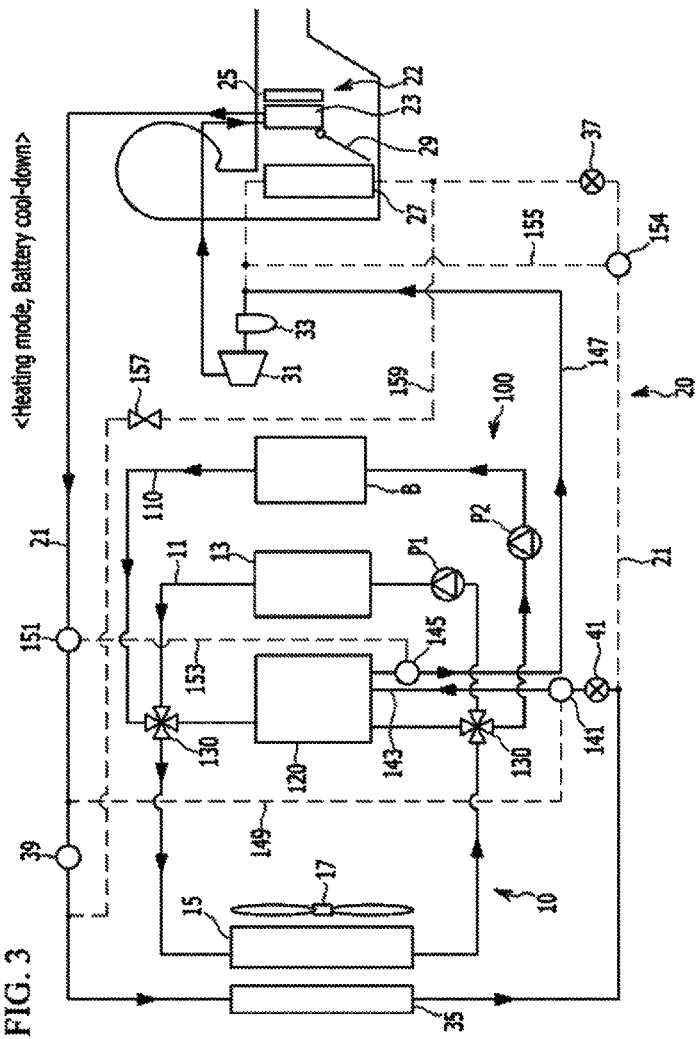
FIG. 3 is an operation state view of the battery being cooled in the exemplary battery cooling system in a heating mode of the vehicle according to the present invention.

In the various embodiments, operation of the battery cooling system for cooling down the battery according to the heating mode of the vehicle will be described with reference to FIG. 3. FIG. 3 is an operation state view of cooling down of the battery in the battery cooling system in a heating mode of the vehicle according to various embodiments of the present invention.

Referring to FIG. 3, when the battery B is cooled down in the heating mode of the vehicle, the cooling line 11 is selectively closed/opened through operation of the first valve 130 according to a cool-down request of the electric device 13 and a coolant temperature in the cooling system 10. Simultaneously, the battery cooling line 110 is opened through operation of the first valve 130 such that the battery B and the heat exchanger 120 are connected with each other. Accordingly, when the cooling line 11 is opened, the cooling line 11 and the battery cooling line 110 are communicated with each other. In this case, the coolant cooled in the radiator 15 circulates the cooling line 11 to cool down the electric device 13 through operation of the first water pump P1 and circulates the battery cooling line 110 through operation of the second water pump P2. The coolant circulating the battery cooling line 110 is cooled through heat-exchange with the refrigerant in the heat exchanger 120 and then supplied to the battery B. Accordingly, the battery B is cooled down by the cooled coolant. Meanwhile, in the heat pump system 20, the first, second, and third branch lines 149, 153, and 155 are closed through operations of the second, third, fourth, and fifth valves 141, 145, 151, and 154. Here, the refrigerant line 21 connected with the evaporator 27 is closed through operation of the fifth valve 154.

Then, the internal condenser 23 may be connected in series to the heat exchanger 120 and the external condenser 35 through the refrigerant line 21. Thus, the refrigerant exhausted from the external condenser 35 is expanded and thus becomes a low-temperature and low-pressure state through operation of the second expansion valve 41, and then introduced into the heat exchanger 120 connected with the first connection line 143. After that, the refrigerant introduced into the heat exchanger 120 exchanges heat with the coolant, and then introduced into the refrigerant line 21 between the evaporator 27 and the accumulator 33 through the second connection line 147. Accordingly, the coolant of which a temperature is increased while cooling down the battery B is cooled through heat-exchange with the low-temperature low-pressure refrigerant in the heat exchanger 120. The cooled coolant is supplied back to the battery B through the battery cooling line 110. That is, the coolant can effectively cool down the battery B through iterative performance of the above-stated operation.

Meanwhile, the refrigerant line 21 connected to the first expansion valve 37 and the evaporator 27 is closed through operation of the fifth valve 154. Accordingly, the coolant is introduced into the heat exchanger 120 through the second expansion valve 41. In addition, the coolant is not introduced into the first expansion valve 37 and the evaporator 27. In such a state, the opening/closing door 29 is opened so as to make the external air which has been introduced into the HVAC module 22 and then passed through the evaporator 27 pass through the internal condenser 23. Accordingly, the external air introduced from the outside is introduced as in a room temperature state without being cooled when passing through the evaporator 27 where the refrigerant is not supplied. The introduced external air is increased in temperature while passing through the internal condenser 23 and the high-temperature external air is introduced into the inside of the vehicle while passing through the heater 25 such that the inside of the vehicle can be warmed up.

After that, the refrigerant is passed through the orifice 39 and then introduced into the external condenser 35, and then condensed through heat-exchange with an external air while passing through the external condenser 35. In this case, the orifice 39 may operate as a valve. That is, through iterative performance of the above-stated operation, the refrigerant warms up the inside of the vehicle in the heating mode, and at the same time, the refrigerant in a low-temperature state cools the coolant through heat-exchange while passing through the heat exchanger 120.

Figure 4:
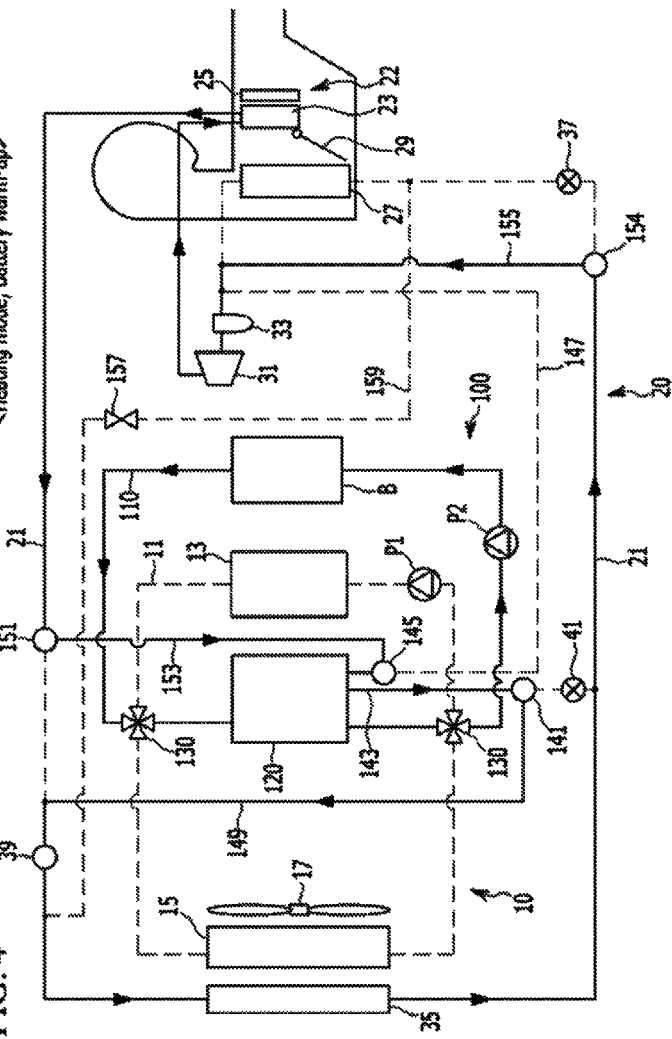
FIG. 4 is an operation state view of the battery being warmed up in the exemplary battery cooling system in the heating mode of the vehicle according to the present invention.

In various embodiments, operation of the battery cooling system when the battery is warmed up in the heating mode of the vehicle will be described with reference to FIG. 4. FIG. 4 is an operation state view of warming of the battery in the battery cooling system of the vehicle according to various embodiments of the present invention in the heating mode of the vehicle.

Referring to FIG. 4, when the battery B is warmed up in the heating mode of the vehicle, the cooling line 11 is closed through operation of the first valve 130 in the cooling system 10. Simultaneously, the battery cooling line 110 is opened through operation of the first valve 130 such that the battery B and the heat exchanger 120 are connected with each other. Then, the coolant circulates the battery cooling line 110 through operation of the second water pump P2 such that a temperature of the coolant is increased through heat-exchange with a high-temperature refrigerant in the heat exchanger 120. Accordingly, the battery B is warmed up by the coolant having the increased temperature.

Meanwhile, in the heat pump system 20, the first, second, and third branch lines 149, 153, and 155 are opened through operations of the second, third, fourth, and fifth valves 141, 145, 151, and 154. Here, the refrigerant line 21 that connects the evaporator 27 and the fifth valve 154 and the second connection line 147 are closed. Then, the internal condenser 23 may be connected in series to the heat exchanger 120 and the external condenser 35 through the refrigerant line 21. Thus, the refrigerant exhausted from the external condenser 35 flows through the refrigerant line 21 to warm up the inside of the vehicle and then sequentially passes the accumulator 33, the compressor 31, and the internal condenser 23 through the third branch line 155. There, the refrigerant line 21 connecting the first expansion valve 37 and the evaporator 27 is closed through operation of the fifth valve 154. Accordingly, introduction of the refrigerant into the first expansion valve 37 and the evaporator 27 is prevented. In such a state, the opening/closing door 29 is opened to make the external air which has been introduced into the HVAC module 22 and thus passed through the evaporator 27 pass through the internal condenser 23.

Accordingly, the external air introduced from the outside is introduced in a room temperature state without being cooled when passing through the evaporator 27 where the refrigerant is not supplied. The introduced external air is changed to a high temperature state while passing through the internal condenser 23 and then introduced into the inside of the vehicle after being passed through the selectively operating heater 25 such that the inside of the vehicle is warmed up. After that, the refrigerant is introduced to the second branch line 153 through operation of the third and fourth valves 145 and 151 and then supplied in a high-temperature state to the heat exchanger 120. Here, the coolant is increased in temperature while exchanging heat with the high-temperature refrigerant introduced into the heat exchanger 120. The coolant having the increased temperature is supplied back to the battery B through the battery cooling line 110.

That is, the coolant can effectively warm up the battery B through iterative performance of the above-stated operation. Meanwhile, the refrigerant passed through the heat exchanger 120 is exhausted through the first connection line 143 and then circulates to the first branch line 149, opened through operation of the second valve 141. The refrigerant passed through the first branch line 149 is expanded while passing through the orifice 39 and introduced into the external condenser 35, and then condensed through heat-exchange with the external air while passing through the external condenser 35. In this case, the orifice 39 may operate as an expansion valve. Accordingly, the external condenser 35 may be served to evaporate the refrigerant.

Here, the refrigerant line 21 connecting the orifice 39 and the fourth valve 151 is closed through operation of the fourth valve 151. That is, the refrigerant warms up the inside of the vehicle through iterative performance of the above-stated operation, and at the same time the refrigerant passes through the heat exchanger 120 while being in a high-temperature state such that a temperature of the coolant is increased. The coolant having the increased temperature can quickly warm up the battery B while circulating the battery cooling line 110 through operation of the second water pump P2. Meanwhile, when the battery B is cooled down or warmed up in the heating mode of the vehicle, the cooling line 11 is closed in various embodiments, but this is not restrictive. According to a cool-down request of the electric device 13 and a coolant temperature, the cooling line 11 can be selectively opened through operation of the first valve 130.

Figure 5:
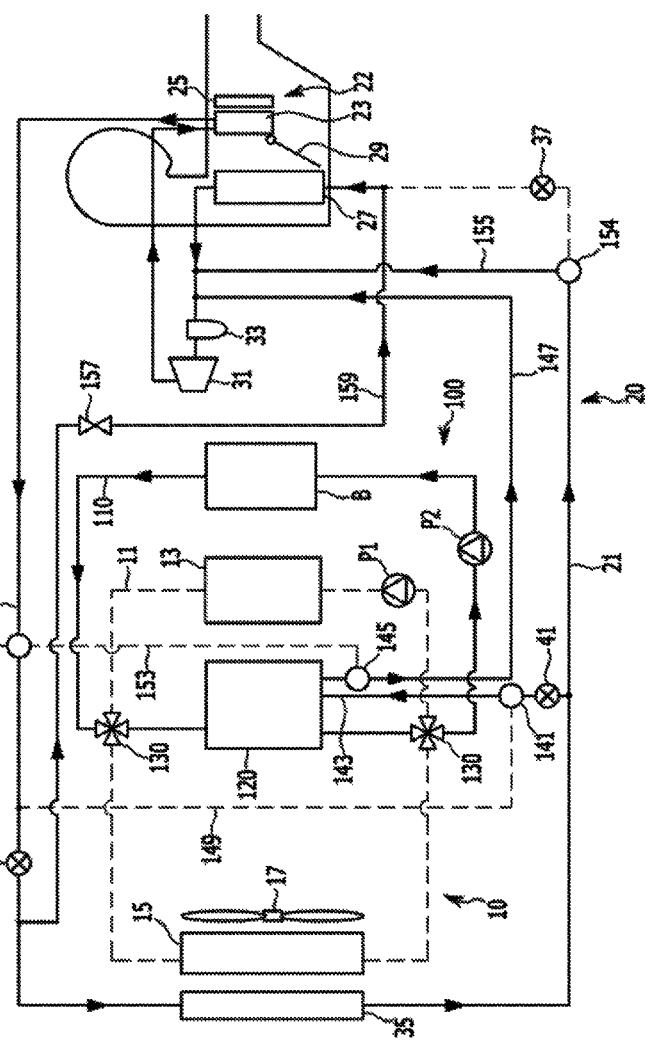
FIG. 5 is an operation state view of the battery being warmed up in the exemplary battery cooling system in a heating/dehumidification mode of the vehicle according to the present invention.

In various embodiments, operation of the battery cooling system for warming up the battery according to the heating/dehumidification mode of the vehicle will be described with reference to FIG. 5. FIG. 5 is an operation state view illustrating warming-up operation of the battery cooling system according to the heating/dehumidification mode of the vehicle according to various embodiments of the present invention will be described. Referring to FIG. 5, when the battery B is warmed up in the heating/dehumidification mode of the vehicle, the cooling line 11 may be selectively opened/closed through operation of the first valve 130 according to a cool-down request of the electric device 13 and a coolant temperature in the cooling system 10. In various embodiments, the cooling line 11 exemplarily closed will be described.

At the same time, the battery cooling line 110 is opened so as to connect the battery B and the heat exchanger 120 through operation of the first valve 130. Then, the coolant circulates the battery cooling line 110 through operation of the second water pump P2 and a temperature of the coolant is increased by exchanging heat with a high-temperature refrigerant in the heat exchanger 120. Accordingly, the battery B is warmed up by the coolant having the increased temperature. Meanwhile, in the heat pump system 20, the first, second, and third branch lines 149, 153, and 155 are opened through operations of the second, third, fourth, and fifth valves 141, 145, 151, and 154. Further, the dehumidification line 159 is opened through operation of the sixth valve 157 so as to make the refrigerant introduced into the external condenser 35 partially circulated.

Here, the coolant line 21 connecting the evaporator 27 and the fifth valve 154 and the second connection line 147 may be closed. Then, the internal condenser 23 may be connected in series to the heat exchanger 120 and the external condenser 35 through the refrigerant line 21. Thus, the refrigerant exhausted from the external condenser 35 flows through the refrigerant line 21 so as to warm up the inside of the vehicle, and sequentially passes the accumulator 33, the compressor 21, and the internal condenser 23 through the third branch line 155.

Here, the refrigerant line 21 connecting the first expansion valve 37 and the evaporator 27 is closed through operation of the fifth valve 154. However, a part of the refrigerant expanded while passing through the orifice 39 is introduced into the evaporator 27 through the dehumidification line 159. In such a state, the opening/closing door 29 is opened to make external air which has been introduced into the HVAC module 22 and thus passed through the evaporator 27 pass the internal condenser 23.

Here, the external air introduced into the HVAC module 22 is dehumidified while passing through the evaporator 27 by a low-temperature low-pressure refrigerant. After that, the refrigerant changed into a high-temperature state while passing through the internal condenser 23 and then introduced into the inside of the vehicle after passing through the selectively operating heater 25 such that the inside of the vehicle is heated and dehumidified.

Then, the refrigerant is introduced into the second branch line 153 through operations of the third and fourth valves 145 and 151 and thus the refrigerant in the high-temperature state is supplied to the heat exchanger 120. Here, the coolant is increased in temperature while exchanging heat with the high-temperature refrigerant introduced into the heat exchanger 120. The coolant having the increased temperature is supplied back to the battery B through the battery cooling line 110. That is, the battery B can be effectively warmed up through iterative performance of the above-stated operation.

The refrigerant passed through the heat exchanger 120 is exhausted through the first connection line 143, and is circulated to the first branch line 149 opened from operation of the second valve 141. The refrigerant passed through the first branch line 149 is expanded through the orifice 39. A part of the expanded refrigerant is circulated to the dehumidification line 159. In addition, the rest of the expanded refrigerant is introduced to the external condenser 35 and then condensed through heat-exchange with the external air while passing through the external condenser 35.

Accordingly, the orifice 39 may operate as an expansion valve that expands the refrigerant. Here, the refrigerant line 21 connecting the orifice 39 and the fourth valve 151 is closed through operation of the fourth valve 151. That is, the refrigerant heats and dehumidifies the inside of the vehicle through iterative performance of the above-state operation. At the same time, the refrigerant at the high-temperature state increases a temperature of the coolant through heat-exchange with the coolant while passing through the heat exchanger 120. The coolant having the increased coolant is supplied to the battery B while circulating the battery cooling line 1110 through operation of the second water pump P2 such that the batter B can be quickly warmed.

In describing operation for cooling down or warming up the battery B in the heating/humidification mode of the vehicle, the cooling line 11 is exemplarily closed, but this is not restrictive. The cooling line 11 can be selectively opened through operation of the first valve 130 according to a cool-down request of the electric device 12 and a temperature of the coolant.

Figure 6:
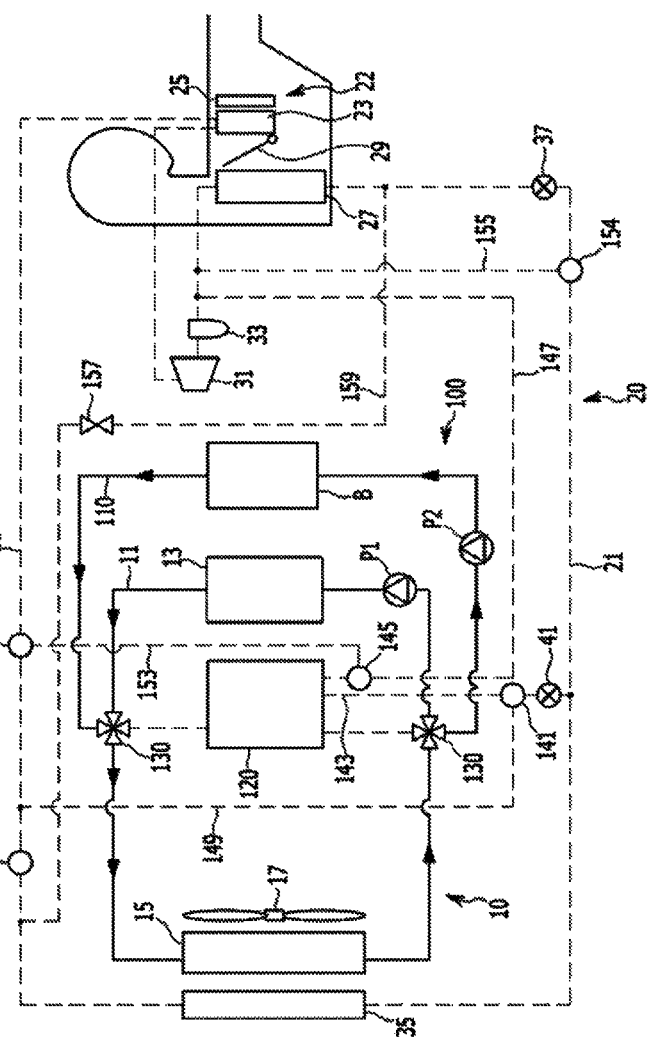
FIG. 6 is an operation state view of the battery being cooled in a non-operation mode of a heat pump system in the exemplary battery cooling system according to the present invention.

In various embodiments, operation of the battery cooling system for cooling down the battery in the non-operation mode of the heat pump system 20 will be described with reference to FIG. 6. FIG. 6 is an operation state view illustrating operation of the battery cooling system for cooling down the battery in the non-operation mode of the heat pump system according to various embodiments of the present invention. Referring to FIG. 6, when the battery B is cooled down in the non-operation mode of the heat pump system 20, the cooling line 11 is opened to connect the electric device 13 and the radiator 15 through operation of the first valve 130 in the cooling system 10. Simultaneously, the battery cooling line 110 connecting the battery B and the heat exchanger 120 is closed through operation of the first valve 130. In such a state, the cooling line 11 is communicated with the battery cooling line 110.

Then, the coolant cooled in the radiator 35 circulates the cooling line 11 to cool down the electric device 13 through operation of the first water pump P1 and circulates the battery cooling line 110 through operation of the second water pump P2. Thus, a coolant cooled in the radiator 35 is supplied to the battery B. Accordingly, the battery B is cooled by the cooled coolant. That is, when the battery B is cooled down in the non-operation mode of the heat pump system 20, the coolant is supplied to the battery B while being in a cooled state through heat-exchange with external air in the radiator 35 of the cooling system 10 without exchanging heat with a refrigerant, and accordingly, the battery B can be effectively cooled down.

In various embodiments, operation of the heat pump system 20 for warming up the battery in the non-operation mode of the heat pump system 20 will be described with reference to FIG. 7. FIG. 7 is an operation state view illustrating operation for warming up the battery in the battery cooling system according to the non-operation mode of the heat pump system according to various embodiments of the present invention. Referring to FIG. 7, when the battery B is warmed up in the non-operation mode of the heat pump system 20, the cooling line 11 connecting the electric device 13 and the radiator 15 is closed through operation of the first valve 130 in the cooling system 10. At the same time, the battery cooling line 110 connecting the battery B and the heat exchanger 120 is connected through operation of the first valve 130. In such a state, the cooling line 1 is communicated with the battery cooling line 110.

Then, the coolant flows along the cooling line 11 and the battery cooling line 110 through operation of the first water pump P1 and second water pump P2 and thus passes the electric device 13, the battery B, and the heat exchanger 120. In this case, the coolant circulating in the cooling line 11 is increased in temperature while cooling the electric device 13. In such a state, the coolant having the increased temperature flows along the battery cooling line 110 connected with the heat exchanger 120, passes the heat exchanger 120, and then is introduced into the battery B. Accordingly, the coolant being increased in temperature while passing through the electric device 13 passes the battery B such that the battery B can be quickly warmed up.

That is, when the battery B is warmed up in the non-operation mode of the heat pump system 20, the coolant is increased in temperature by a heat source of the electric device 13 in the cooling system 10 without exchanging heat with a refrigerant and then supplied to the battery B such that the battery B can be effectively warmed up. Thus, when the battery cooling system 100 according to various embodiments of the present invention is applied to an electric vehicle or a hybrid vehicle, the heat pump system 20 is interworked with the cooling system 10 that circulates a refrigerant to the electric device 13 including a motor, and warms up or cools down the battery B using the coolant and the refrigerant according to a mode of the vehicle such that the system can be simplified. Further, since the battery B can be effectively warmed up and cooled down according to a mode of the vehicle, the battery can provide optimal performance and a total driving distance of the vehicle can be increased. Furthermore, since the entire system is simplified, manufacturing cost can be saved and the weight of the vehicle can be lightened, and utilization of space can be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery cooling system for a vehicle to warm up or cool down a battery installed in the vehicle by selectively using a refrigerant and a coolant according to a cooling mode, a heating mode, a heating/dehumidification mode, and a non-operation mode of a heat pump system of the vehicle, the battery cooling system comprising:
   a heat exchanger for the battery, connected with a refrigerant line of the heat pump system through first and second connection lines, connected with a cooling line of a cooling system for an electric device through a battery cooling line, and configured to selectively perform heat-exchange between the coolant and the refrigerant introduced into the heat exchanger;
   two first valves respectively disposed in the battery cooling line with the heat exchanger disposed therebetween, and selectively connecting the cooling line and the battery cooling line;
   a first branch line connected with the refrigerant line through a second valve provided on the first connection line; and
   a second branch line selectively connecting the refrigerant line and the second connection line through a third valve provided in the second connection line and a fourth valve provided in the refrigerant line,
   wherein the heat pump system comprises:
      a heating, ventilation, and air condition (HVAC) module connected through the refrigerant line, and provided with a door that controls selective introduction of external air passed through an evaporator to an internal condenser and a heater according to a cooling mode, a heating mode, and a heating/dehumidification mode of the vehicle;
      a compressor connected through the refrigerant line between the evaporator and the internal condenser;
      an accumulator provided in the refrigerant line between the compressor and the evaporator;
      an external condenser connected with the internal condenser through the refrigerant line and disposed in a front portion of the vehicle;
      a first expansion valve provided in the refrigerant line that connects the external condenser and the evaporator;
      a third branch line connected with the refrigerant line between the evaporator and the accumulator through a fifth valve provided between the external condenser and the first expansion valve; and
      a dehumidification line of which a first end is connected with the refrigerant line between the internal condenser and the external condenser and a second end is connected between the evaporator and the expansion valve, and including a sixth valve.

2. The battery cooling system of claim 1, wherein the first connection line includes a second expansion valve.

3. The battery cooling system of claim 1, wherein an orifice is provided in the refrigerant line between the internal condenser and the external condenser.

4. The battery cooling system of claim 3, wherein the orifice selectively opens/closes the refrigerant line or selectively expands the refrigerant passing therethrough.

5. The battery cooling system of claim 3, wherein the first branch line is connected with the refrigerant line between the fourth valve and the orifice.

6. The battery cooling system of claim 1, wherein when the battery is cooled down in the cooling mode of the vehicle:
the first, second, and third branch lines are closed through operations of the second, third, fourth, and fifth valves; and
the external condenser is connected in parallel with the heat exchanger and the evaporator.

7. The battery cooling system of claim 1, wherein when the battery is cooled down in the heating mode of the vehicle:
the first, second, and third branch lines are closed through operations of the second, third, fourth, and fifth valves; and
the refrigerant line connected with the evaporator is closed.

8. The battery cooling system of claim 1, wherein when the battery is warmed up in the heating mode of the vehicle:
the first, second, and third branch lines are opened through operations of the second, third, fourth, and fifth valves; and
the refrigerant line connecting the evaporator and the fifth valve and the second connection line are closed.

9. The battery cooling system of claim 1, wherein when the battery is warmed up in the heating/dehumidification mode of the vehicle:
the first, second, and third branch lines and the dehumidification line are opened through operations of the second, third, fourth, fifth, and sixth valves; and
the refrigerant line connecting the evaporator and the fifth valve and the second connection line are closed.

10. The battery cooling system of claim 1, wherein in the heating mode and heating/dehumidification mode of the vehicle, the internal condenser is connected in series to the heat exchanger and the external condenser.

11. The battery cooling system of claim 1, wherein the second, third, fourth, and fifth valves are three-way valves that are selectively opened/closed in cooling down or warming up of the battery according to a cooling mode, a heating mode, a heating/dehumidification mode of the vehicle, and a non-operation mode of the heat pump system.

12. The battery cooling system of claim 1, wherein the first valve operates to make the coolant selectively introduced into the heat exchanger when the battery needs to be warmed up or cooled down according to a mode of the vehicle, and is a four-way valve.

13. The battery cooling system of claim 1, wherein the cooling system comprises:
an electric device including a motor;
a radiator disposed in a front portion of the vehicle; and
a first water pump provided on the cooling line that connects the electric device and the radiator, for circulation of the coolant.

14. The battery cooling system of claim 13, wherein a second water pump is provided in the battery cooling line between the battery and the heat exchanger.

15. The battery cooling system of claim 13, wherein when the battery is cooled down in the cooling mode and the heating mode of the vehicle:
the battery cooling line is opened for connection between the battery and the heat exchanger through operation of the first valve;
the cooling line is selectively opened/closed through operation of the first valve according to a cool-down request of the electric device and a coolant temperature; and
the cooling line and the battery cooling line are communicated with each other when the cooling line is being opened.

16. The battery cooling system of claim 13, wherein when the battery is warmed up in the heating mode of the vehicle, the cooling line is closed through operation of the first valve and the battery cooling line is opened for connection between the battery and the heat exchanger.

17. The battery cooling system of claim 13, wherein when the battery is warmed up in the heating/dehumidification mode of the vehicle:
the battery cooling line is opened for connection between the battery and the heat exchanger through operation of the first valve; and
the cooling line is selectively opened/closed through operation of the first valve according to a cool-down request of the electric device and a coolant temperature.

18. The battery cooling system of claim 13, wherein when the battery is cooled down in the non-operation mode of the heat pump system:
the cooling line is opened for connection between the electric device and the radiator through operation of the first valve; and
the cooling line and the battery cooling line are communicated with each other while the battery cooling line that connects the battery and the heat exchanger is being closed.

19. The battery cooling system of claim 13, wherein when the battery is warmed up in the non-operation mode of the heat pump system:
the cooling line that connects the electric device and the radiator is closed through operation of the first valve; and
the cooling line and the battery cooling line are communicated with each other while the battery and the heat exchanger are connected with each other through the battery cooling line.

* * * * *